United States Patent [19]

Sakamoto

[11] Patent Number: 5,689,366

[45] Date of Patent: Nov. 18, 1997

[54] COARSE AND FINE ADJUSTMENT FOCUSING APPARATUS FOR A MICROSCOPE

[75] Inventor: Shinobu Sakamoto, Yokohama, Japan

[73] Assignee: Nikon Corporation, Tokyo, Japan

[21] Appl. No.: 553,029

[22] Filed: Nov. 3, 1995

[30] Foreign Application Priority Data

Nov. 4, 1994 [JP] Japan ................................. 6-270088
Oct. 23, 1995 [JP] Japan ................................. 7-273784

[51] Int. Cl.⁶ .......................... G02B 21/26; G02B 21/00
[52] U.S. Cl. ........................................... 359/392; 359/383
[58] Field of Search ............................... 359/368, 380, 359/383, 392

[56] References Cited

U.S. PATENT DOCUMENTS 4,616,517  10/1986  Esmay ................................. 74/10.45

FOREIGN PATENT DOCUMENTS 3-49511  5/1991  Japan .
6-2313   1/1994  Japan .

*Primary Examiner*—Paul M. Dzierzynski
*Assistant Examiner*—Mark Robinson
*Attorney, Agent, or Firm*—Shapiro and Shapiro

[57] ABSTRACT

A coarse and fine adjustment focusing apparatus secured to a microscope body for moving a movable member includes a sun gear secured to a fine adjustment knob shaft, an internal gear unrotatably provided on the same axis as the fine adjustment knob shaft, a first planetary gear meshing with both the sun gear and the internal gear, a second planetary gear being equal in the number of teeth and module to the first planetary gear and disposed on the same shaft as the first planetary gear and meshing with the sun gear, a first resilient number for imparting rotational forces in opposite directions to the first planetary gear and the second planetary gear, a third planetary gear being equal in the number of teeth and module to the first planetary gear and disposed on the same shaft as the first planetary gear and meshing with the internal gear, a second resilient member for imparting rotational forces in opposite directions to the first planetary gear and the third planetary gear, and a power transmitting shaft to which is secured a rotary shaft for rotatably supporting the first, second and third planetary gears and which is rotatable on the same axis as the fine adjustment knob shaft, the power transmitting shaft having a pinion for moving the movable member.

5 Claims, 5 Drawing Sheets

COARSE AND FINE ADJUSTMENT FOCUSING APPARATUS FOR A MICROSCOPE

BACKGROUND OF THE INVENTION

1. Field of the Invention

This invention relates to a coarse and fine adjustment focusing apparatus for a microscope, and particularly to a coarse and fine adjustment focusing apparatus using a planetary gear mechanism.

2. Related Background Art

Today, many of focusing apparatuses for microscopes are of the single shaft coarse movement type in which a coarse adjustment knob and a fine adjustment knob are disposed coaxially with each other. When the coarse adjustment knob is rotated, a stage can be vertically moved relatively greatly and when the fine adjustment knob is rotated, the stage can be vertically finely moved.

A coarse and fine adjustment focusing apparatus of the single shaft coarse and fine adjustment type according to the prior art is shown in FIGS. 6A and 6B of the accompanying drawings. FIG. 6B is a cross-sectional view taken along the line VIB—VIB of FIG. 6A.

A sun gear 23 is secured near the end portion of a fine adjustment shaft 21 and is in meshing engagement with a planetary gear 24. The rotary shaft of the planetary gear 24 is studded in a pinion case 29 and a pinion gear 31 formed on the outer periphery of the pinion case 29 is in meshing engagement with a rack 32. The planetary gear 24 is in meshing engagement with an internal gear 25 secured to a coarse and fine adjustment focusing apparatus body 35. Also, a coarse adjustment knob 30 is secured to the pinion case 29 and fine adjustment knobs 22 are secured to the opposite ends of a fine adjustment shaft 21.

When the fine adjustment knob 22 is rotated, the sun gear 23 secured to the fine adjustment shaft 21 is rotated and the planetary gear 24 meshing with the sun gear 23 rotates about the rotary shaft 26 while revolving around the sun gear 23. By the revolution of the planetary gear 24, the pinion case 29 is rotated about the fine adjustment shaft 21 and the rack 32 meshing with the pinion gear 31 is vertically moved and a slider 34 is vertically moved, whereby a microscope or a stage, not shown, is vertically moved and the focusing of the microscope is effected. In this case, the internal gear 25 is stationary and therefore, the reduction gear ratio γ of the pinion gear 31 relative to the fine adjustment shaft 21 is γ=1/((the number of teeth of internal gear 25/the number of teeth of sun gear 23)+1).

On the other hand, when the coarse adjustment knob 30 is rotated, the pinion gear 31 is rotated the same number of times as the coarse adjustment knob 30 and the rack 32 meshing with the pinion gear 31 is vertically moved and accordingly, the microscope or the stage, not shown, is vertically moved with the slider 34, whereby the focusing of the microscope can be effected.

In the prior-art apparatus as described above, when quick focusing is necessary, the coarse adjustment knob is rotated, and when accurate focusing is necessary, the fine adjustment knob is rotated, whereby appropriate focusing is made possible.

Since, however, in the above-described coarse and fine adjustment focusing apparatus using a planetary gear, the gears are used, backlash occurs between the gears.

Moreover, the planetary gear meshes with the sun gear and the internal gear simultaneously and therefore, the backlash adjustment by the adjustment of the distance between the centers is impossible. This backlash becomes a great hindrance when accurate focusing is required.

As a method of avoiding the backlash of the gear, there have been proposed coarse and fine adjustment focusing apparatuses provided with a ball reduction mechanism using balls instead of gears and a planetary friction wheel mechanism (for example, Japanese Utility Model Application Laid-Open No. 3-49511 and Japanese Utility Model Application Laid-Open No. 6-2313).

These, however, use a frictional force for the transmission of power and therefore suffer from the problem that the transmission of power becomes impossible due to transmission loss or abrasion by slip. They have also suffered from the problem that their structure is complicated and moreover, wear resistance is required of a friction wheel and parts contacting with the friction wheel and this leads to high manufacturing costs.

SUMMARY OF THE INVENTION

The present invention has as its object the provision of a coarse and fine adjustment focusing apparatus for a microscope which is free of backlash and can accomplish accurate focusing and which is free of power transmission loss and has sufficient durability.

To achieve the above object, the present invention provides a coarse and fine adjustment focusing apparatus secured to a microscope body for moving a movable member, comprising:

- a sun gear secured to a fine adjustment knob shaft;
- an internal gear unrotatably provided on a same axis as the fine adjustment knob shaft;
- a first planetary gear meshing with both the sun gear and the internal gear;
- a second planetary gear being equal in the number of teeth and module to the first planetary gear and disposed on the same shaft as the first planetary gear and meshing with the sun gear;
- a first resilient member for imparting rotational forces in opposite directions to the first planetary gear and the second planetary gear;
- a third planetary gear being equal in the number of teeth and module to the first planetary gear and disposed on the same shaft as the first planetary gear and meshing with the internal gear;
- a second resilient member for imparting rotational forces in opposite directions to the first planetary gear and the third planetary gear; and
- a power transmitting shaft to which is secured a rotary shaft for rotatably supporting the first, second and third planetary gears and which is rotatable on the same axis as the fine adjustment knob shaft, the power transmitting shaft having a pinion for moving the movable member.

In the present invention, provision is made of the second planetary gear equal in the number of teeth and module to the first planetary gear and disposed on the same shaft as the first planetary gear and meshing with the sun gear and provision is made of the first resilient member for imparting rotational forces in opposite directions to the first planetary gear and the second planetary gear and therefore, any backlash between the sun gear and the first planetary gear with the teeth of the sun gear interposed therebetween is eliminated by the first planetary gear and the second planetary gear provision is also made of the third planetary gear equal in the number of teeth and module to the first planetary gear and disposed on the same shaft as the first planetary gear and meshing with the internal gear and provision is made of the second resilient member for imparting rotational forces in opposite directions to the first planetary gear and the third planetary gear and therefore, any backlash between the internal gear and the first planetary gear with the teeth of the internal gear interposed therebetween is eliminated by the first planetary gear and the third planetary gear and further, a planetary gear reduction mechanism can be made free of any backlash between the gears.

DESCRIPTION OF THE PREFERRED EMBODIMENTS

Figure 1A:
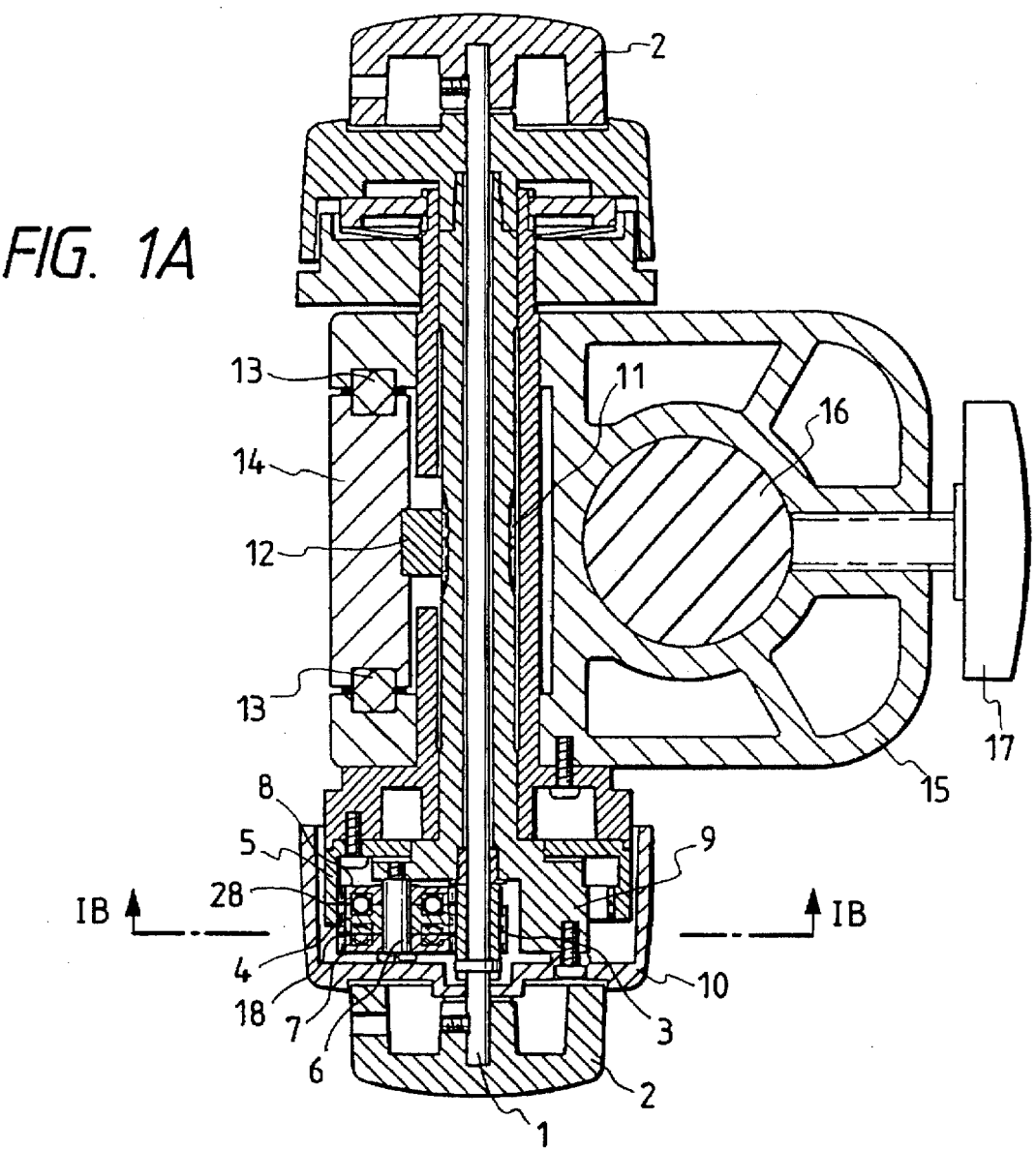
FIG. 1A is a horizontal cross-sectional view showing a first embodiment of the coarse and fine adjustment focusing apparatus of the present invention.
Figure 1B:
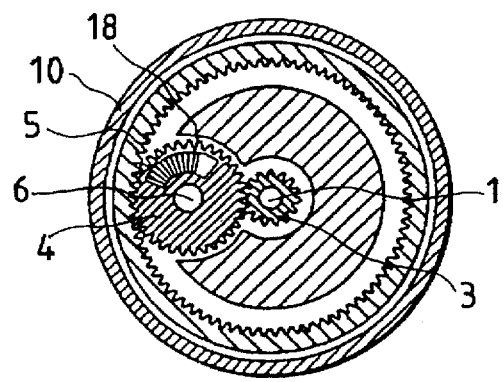
FIG. 1B is a cross-sectional view taken along the line IB—IB of FIG. 1A.

A coarse and fine adjustment focusing apparatus for a microscope according to a first embodiment of the present invention is shown in FIGS. 1A and 1B. FIG. 1B is a cross-sectional view taken along the line IB—IB of FIG. 1A. As shown in FIG. 1A, fine adjustment knobs 2 are secured to the opposite ends of a fine adjustment shaft 1 and a sun gear 3 is secured near one end portion of the fine adjustment shaft 1. A first planetary gear 4 is in meshing engagement with the sun gear 3 and further, the first planetary gear 4 is in meshing engagement with an internal gear 5 coaxial with the sun gear 3 and secured to a focusing apparatus body 15. The first planetary gear 4 is rotatable about a rotary shaft 6. A second planetary gear 7 and a third planetary gear 8 are disposed with the first planetary gear 4 interposed therebetween. The second planetary gear 7 and the third planetary gear 8 are rotatable about the rotary shaft 6. In the present embodiment, the first, second and third planetary gears have the same diameter and the same number of teeth. Further, the first planetary gear 4 and the second planetary gear 7 are in meshing engagement with the sun gear 3, and the first planetary gear 4 and the third planetary gear 8 are in meshing engagement with the internal gear 5. A compression coil spring 18 which is a first resilient member is provided between the first planetary gear and the second planetary gear. A compression coil spring 28 which is a second resilient member is provided between the first planetary gear and the third planetary gear. The rotary shaft 6 is studded in a pinion case 9, and a coarse adjustment knob 10 is fixed to the right end of the pinion case 9.

A pinion gear 11 is provided on the outer periphery of the central portion of the pinion case 9. The pinion gear 11 is in meshing engagement with a rack 12, which is secured to a slider 14 guided by a guide 13 and movable in a direction perpendicular to the plane of the drawing sheet of FIG. 1A. A microscope or a stage, not shown, is mounted on the slider 14.

The focusing apparatus body 15 is inserted in the strut 16 of a stand, not shown, and is fixed by a clamp screw 17.

The fine adjustment focusing operation will now be described. When the fine adjustment knob 2 is rotated, the sun gear 3 is rotated by the same amount as the fine adjustment knob 2. Thereby the first planetary gear 4 begins to rotate, but since the first planetary gear 4 is also in meshing engagement with the internal gear 5, the first planetary gear rotates about the rotary shaft 6 while revolving around the sun gear 3.

Accordingly, the revolution of the first planetary gear 4 around the sun gear 3 provides the rotation of the pinion case 9, and the rack 12 meshing with the pinion gear 11 provided at the center of the pinion case 9 and the slider 14 are moved in a direction perpendicular to the plane of the drawing sheet of FIG. 1A, whereby focusing is effected. The reduction gear ratio γ of the pinion gear 11 to the fine adjustment knobs 2 is γ=1/((the number of teeth of internal gear 5/the number of teeth of sun gear 3)+1).

On the other hand, in the coarse movement focusing operation, the rotation of the coarse adjustment knob 10 is directly transmitted to the pinion gear 9 because the coarse adjustment knob 10 is secured to the pinion case 9, and thus the microscope is vertically moved, whereby quick focusing is effected.

Figure 2A:
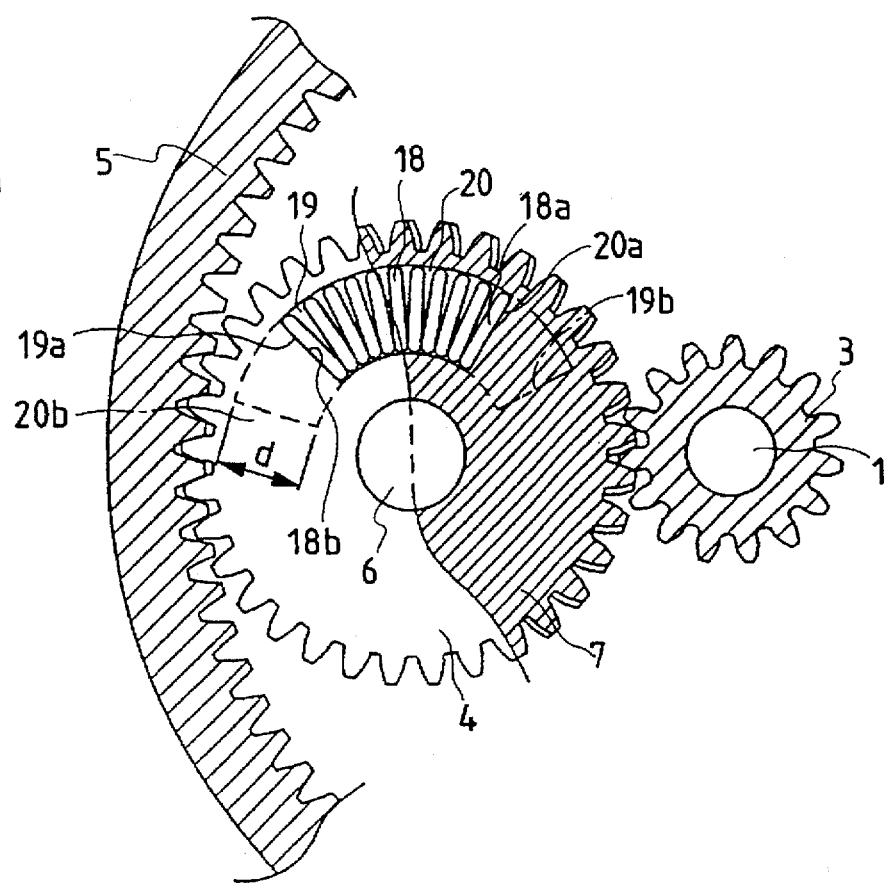
FIG. 2A is an enlarged view of a planetary gear according to the present invention.
Figure 2B:
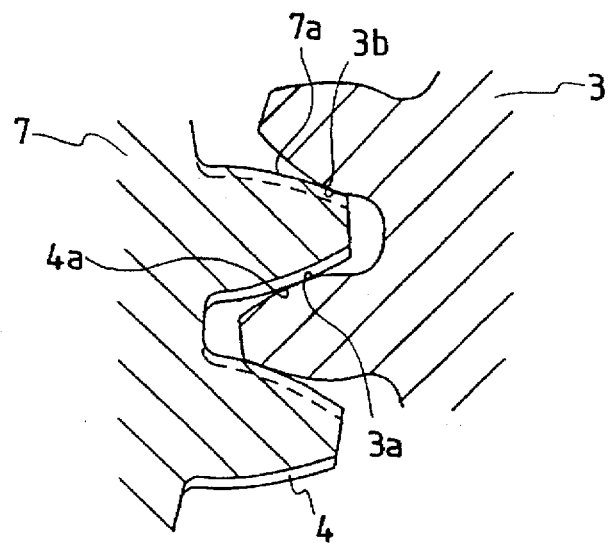
FIG. 2B is a fragmentary enlarged view of the teeth of a planetary gear meshing with a sun gear.

The functions of the second and third planetary gears will now be described. FIG. 2A is a fragmentary enlarged view of the sun gear and the planetary gears, and FIG. 2B is a fragmentary enlarged view of teeth meshing with each other. On those sides of the first planetary gear 4 and the second planetary gear 7 which are opposed to each other, grooves 19 and 20 are formed along circumferences of the gears. The compression coil spring 18 is inserted in the portion where the groove 19 formed on the side of the first planetary gear 4 and the groove 20 formed on the side of the second planetary gear 7 overlap each other. As can be seen from FIG. 2A, on the side of the first planetary gear 4, the groove 19 of a width d and somewhat deeper than ½ of the outer diameter of the compression coil spring 18 extends from 19a to 19b along the circumference of the pitch circle of the gear, and also on the side of the second planetary gear 7, the groove 20 of a width d and somewhat deeper than ½ of the outer diameter of the compression coil spring 18 extends from 20a to 20b along the circumference of the pitch circle of the gear. The width d of the grooves 19 and 20 is somewhat greater than the outer diameter of the compression coil spring 18.

The compression coil spring 18, as a resilient member for imparting rotational forces in opposite directions to the first planetary gear 4 and the second planetary gear 7, is inserted in the portion where the groove 19 and the groove 20 overlap each other. One end 18a of the compression coil spring 18 is in contact with the end portion 19a of the groove 19 formed on the first planetary gear 4, and the other end 18b of the compression coil spring 18 is in contact with the end portion 20a of the groove 20 formed on the second planetary gear 7.

When the first planetary gear 4 and the second planetary gear 7 are to be brought into meshing engagement with the sun gear 3, the second planetary gear 7 is rotated about the rotary shaft 6 so as to compress the compression coil spring 18, thereby bringing about a state as shown in FIG. 2A. Rotational forces in opposite directions are imparted to the first planetary gear 4 and the second planetary gear 7 by the stretching force of the compression coil spring 18. Accordingly, as shown in FIG. 2B, the tooth surface 4a of the first planetary gear 4 is always pressed against the tooth surface 3a of the sun gear 3, and the tooth surface 7a of the second planetary gear 7 is always pressed against the tooth surface 3b of the sun gear 3 which is opposed to the tooth surface 3a. Accordingly, any backlash between the sun gear 3 and the first planetary gear 4 is eliminated.

A construction similar to what has been described above is provided between the first planetary gear 4 and the third planetary gear 8, and the first planetary gear 4 and the third planetary gear 8 are brought into meshing engagement with the internal gear 5, with a compression coil spring 28 which is provided between the first planetary gear 4 and the third planetary gear 8 being compressed. Thereby, one tooth surface of the first planetary gear 4 can always be pressed against one tooth surface of the internal gear 5, whereby any backlash between the first planetary gear 4 and the internal gear 5 is eliminated.

Figure 3:
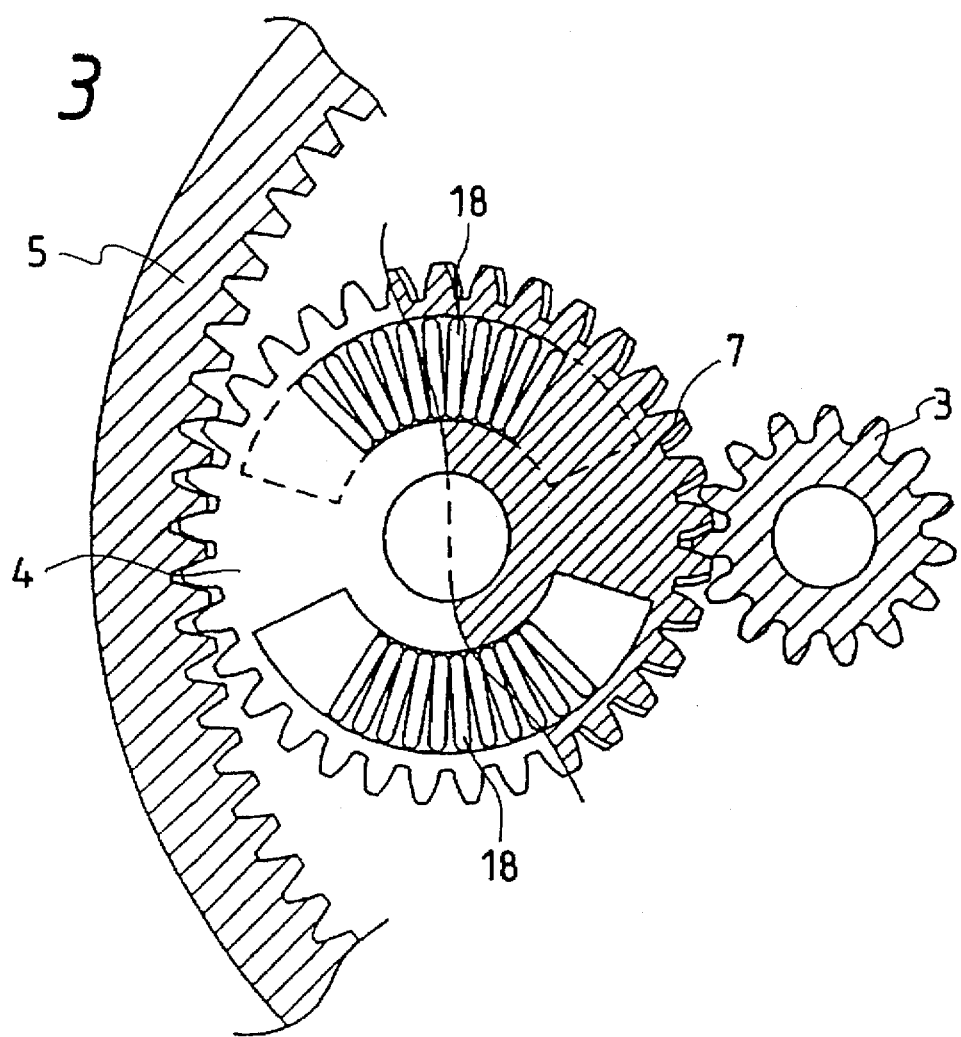
FIG. 3 is an enlarged fragmentary cross-sectional view showing another example of the principal portions of the coarse and fine adjustment focusing apparatus of the present invention.

Alternatively, a plurality of (in FIG. 3, two) compression coil springs 18 may be disposed between the first planetary gear 4 and the second planetary gear 7. This also holds true of the compression coil spring 28 disposed between the first planetary gear 4 and the third planetary gear 8.

As described above, in the present embodiment, two planetary gears, i.e., the first planetary gear 4 and the second planetary gear 7, are brought into meshing engagement with the teeth of the sun gear 3 with the two planetary gears biased so as to rotate in opposite directions, and two planetary gears, i.e., the first planetary gear 4 and the third planetary gear 8, are brought into meshing engagement with the teeth of the internal gear 5 with the two planetary gears biased so as to rotate in opposite directions. A planetary gear reduction mechanism free of backlash is provided by such a construction and therefore, there can be realized a coarse and fine adjustment focusing apparatus for a microscope which is high in power transmission efficiency and good in durability.

Also, the gears can be made by injection molding, and this leads to low costs.

Figure 4:
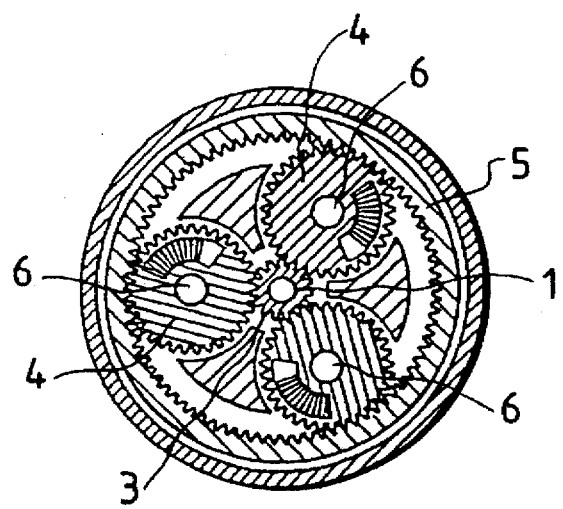
FIG. 4 shows a second embodiment of the coarse and fine adjustment focusing apparatus of the present invention.

FIG. 4 shows a second embodiment of the present invention. This embodiment is one in which the first, second and third planetary gears are made into a set of planetary gear members and these three planetary gear members are disposed at trisectioned positions on the circumference of the sun gear. In this embodiment, as compared with the previous embodiment, the opposite rotational forces imparted to a set of planetary gear members can be made into ⅓.

If a plurality of sets of planetary gear members are thus employed, pressure forces applied to the tooth surfaces meshing with each other can be reduced and therefore, the frictional resistance between the tooth surfaces becomes small and the operation can be made smooth.

The number of the planetary gear members is not limited to three, but may be two or four or more. If three planetary gear members are disposed at equal intervals, equal forces can be applied from around the sun gear and stable transmission of power can be effected.

Figure 5A:
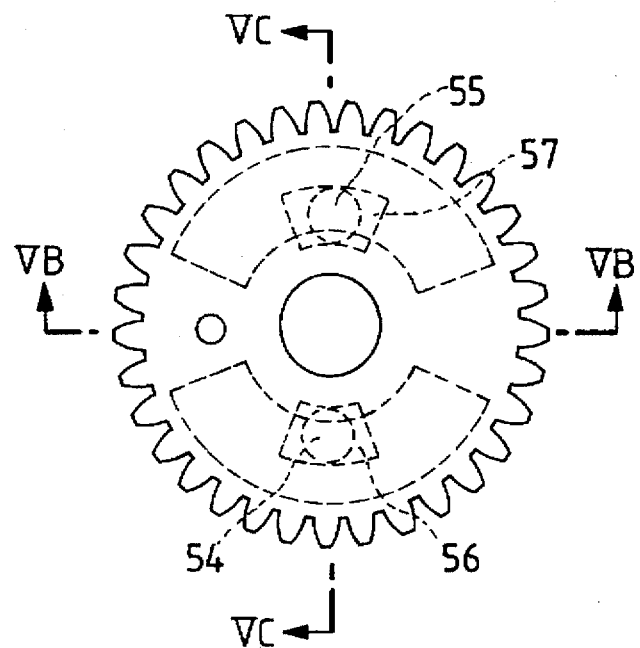
FIG. 5A shows a third embodiment of the coarse and fine adjustment focusing apparatus of the present invention.
Figure 5B:
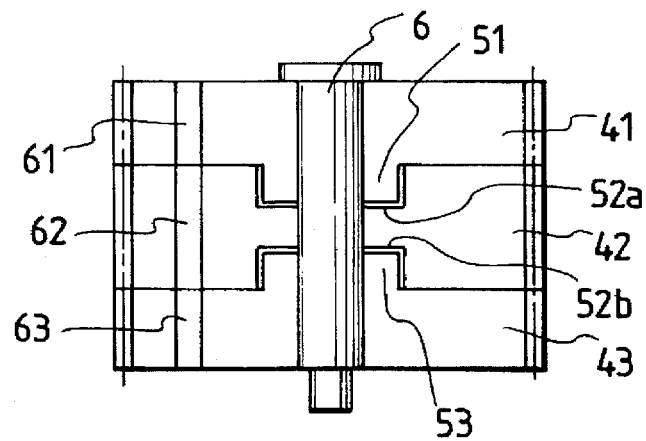
FIG. 5B is a cross-sectional view taken along the line VB—VB of FIG. 5A.
Figure 5C:
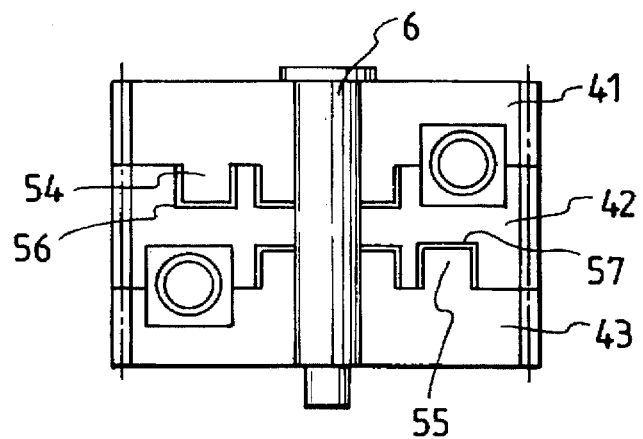
FIG. 5C is a cross-sectional view taken along the line VC—VC of FIG. 5A.
Figure 6A:
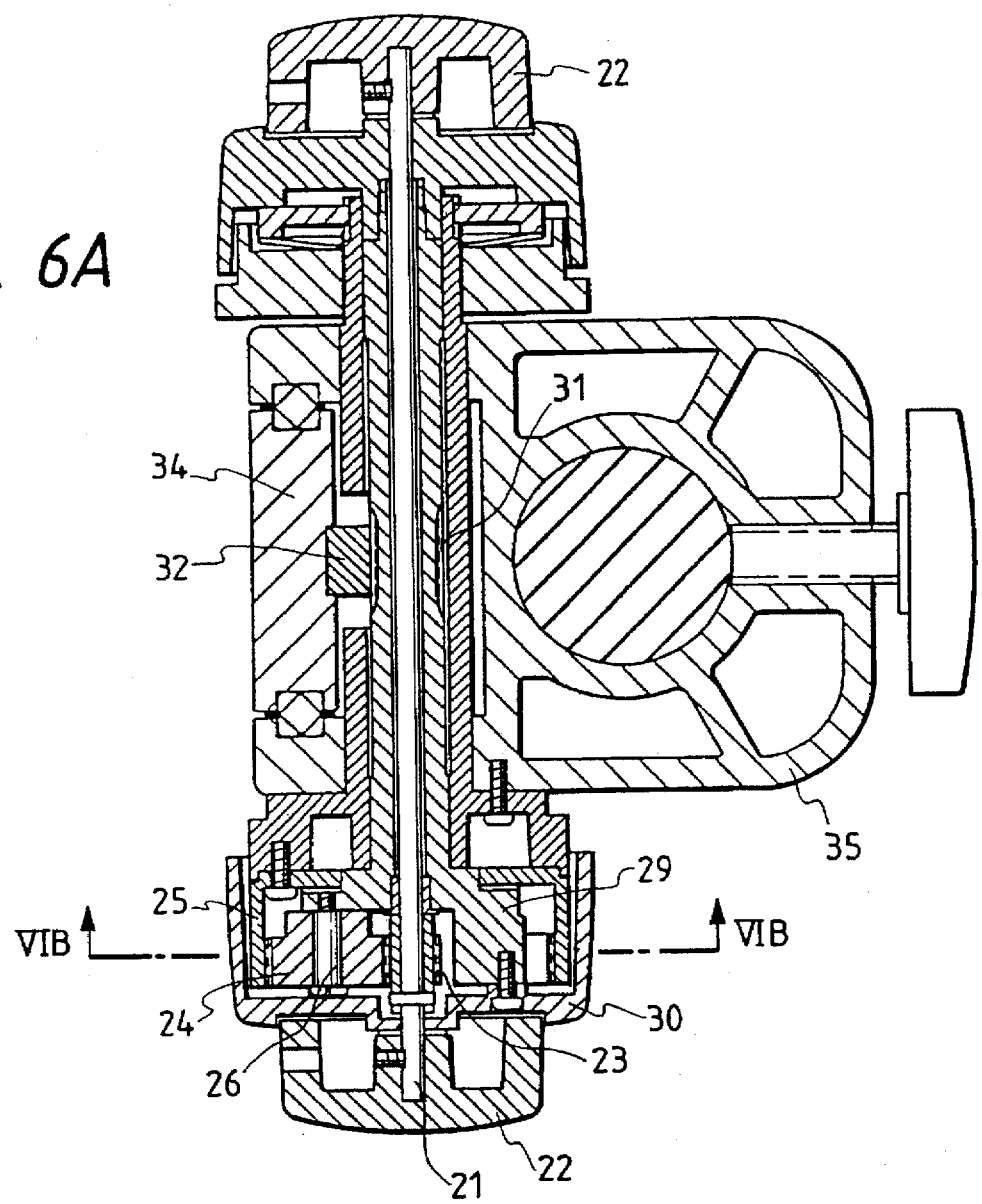
FIG. 6A is a horizontal cross-sectional view showing another example of a coarse and fine adjustment focusing apparatus for a microscope according to the prior art.
Figure 6B:
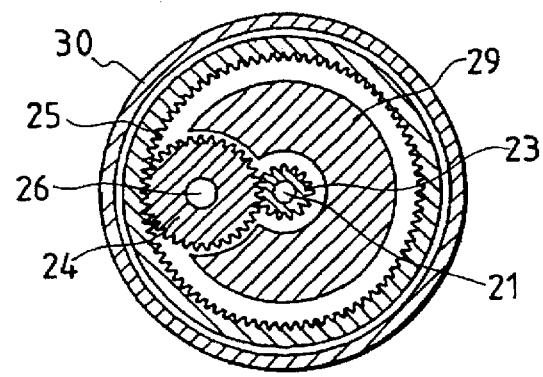
FIG. 6B is a cross-sectional view taken along the line VIB—VIB of FIG. 6A.

FIGS. 5A, 5B and 5C show a third embodiment of the present invention. FIG. 5B is a cross-sectional view taken along the line VB—VB of FIG. 5A, and FIG. 5C is a cross-sectional view taken along the line VC—VC of FIG. 5A. This embodiment differs from the previously described embodiments in that a planetary gear member comprising first, second and third planetary gears of the same shape is constructed so as to be capable of being extraneously assembled as a unit and the assembly of the coarse and fine adjustment focusing apparatus is simplified.

Projecting portions 51 and 53 are formed on the central portions of a second planetary gear 41 and a third planetary gear 43, respectively, in the present embodiment, and are fitted in recesses 52a and 52b, respectively, formed in the central portion of the first planetary gear 42. These three planetary gears are fitted together and inserted into the rotary shaft 6. If, at this time, the fitting gaps among the three planetary gears are very narrow, an opening in the central portion (an opening for receiving the rotary shaft 6) will deviate due to the irregularity of the manufacturing accuracy of each planetary gear and the planetary gears will become incapable of being inserted onto the rotary shaft 6. Accordingly, it is necessary to make the fitting gaps among the planetary gears larger than the fitting gap between each planetary gear and the rotary shaft 6.

Also, the planetary gears 41 to 43 are formed with through-holes 61, 62 and 63 of the same cross-sectional shape, respectively. Design is made such that the teeth of the planetary gears become uniform by inserting a pin into these through-holes 61 to 63 when aligned with one another.

Also, when the through-holes 61 to 63 are to be aligned with one another, it is difficult to accomplish the aligning work because of rotational forces imparted to adjacent ones of the planetary gears by compression coil springs disposed between adjacent ones of the planetary gears. In the present embodiment, as shown in FIG. 5C, protruded portions 54 and 55 are provided on the sides of the second and third planetary gears, respectively, and grooves 56 and 57 for loosely inserting the respective protruded portions 54 and 55 thereinto are formed in the side of the first planetary gear. These protruded portions are engaged with the grooves to thereby limit the relative rotation of the planetary gears and therefore, it is possible to keep the through-holes 61 to 63 aligned with one another to a certain degree.

What is claimed is:

1. A coarse and fine adjustment focusing apparatus secured to a microscope body for moving a movable member, comprising:

a sun gear secured to a fine adjustment knob shaft;

an internal gear unrotatably provided on a same axis as said fine adjustment knob shaft;

a first planetary gear disposed on a rotary shaft and meshing with both said sun gear and said internal gear;

a second planetary gear being equal in number of teeth and module to said first planetary gear and disposed on said rotary shaft and meshing with said sun gear;

a first resilient member for imparting rotational forces in opposite directions to said first planetary gear and said second planetary gear, respectively;

a third planetary gear being equal in number of teeth and module to said first planetary gear and disposed on said rotary shaft and meshing with said internal gear;

a second resilient member for imparting rotational forces in opposite directions to said first planetary gear and said third planetary gear, respectively; and a power transmitting shaft to which is secured said rotary shaft and which is rotatable on the same axis as said fine adjustment knob shaft, said power transmitting shaft having a pinion for moving said movable member.

2. The coarse and fine adjustment focusing apparatus of claim 1, wherein a plurality of sets of planetary gear members, each set comprising a first planetary gear, a second planetary gear, a first resilient member, a third planetary gear, and a second resilient member as aforesaid, are disposed around said sun gear.

3. The coarse and fine adjustment focusing apparatus of claim 1, further comprising:

first fitting means comprising a projecting portion and a recessed portion for fitting said first planetary gear and said second planetary gear together, said first fitting means being provided between sides of said first planetary gear and said second planetary gear which are opposed to each other; and second fitting means comprising a projecting portion and a recessed portion for fitting said first planetary gear and said third planetary gear together, said second fitting means being provided between sides of said first planetary gear and said third planetary gear which are opposed to each other.

4. The coarse and fine adjustment focusing apparatus of claim 1, wherein each of said first, second and third planetary gears has a through-hole extending in a direction substantially parallel to said rotary shaft.

5. The coarse and fine adjustment focusing apparatus of claim 1, further comprising:

a first rotation limiting mechanism provided between sides of said first planetary gear and said second planetary gear which are opposed to each other for limiting relative rotation of said first and second planetary gears, said first rotation limiting mechanism comprising a protruded portion protruding in a direction perpendicular to those sides, and a groove portion for loosely receiving said protruded portion; and a second rotation limiting mechanism provided between sides of said first planetary gear and said third planetary gear which are opposed to each other for limiting relative rotation of said first and third planetary gears, said second rotation limiting mechanism comprising a protruded portion protruding in a direction perpendicular to those sides, and a groove portion for loosely receiving said protruded portion.

* * * * *